United States Patent Office 3,422,002
Patented Jan. 14, 1969

3,422,002
HYDROREFINING WITH A SULFIDED CATALYST OF A PLATINUM SERIES METAL AND MOLYBDENA ON ALUMINA
Stephen M. Kovach, Highland, Ind., and Edward S. Rogers, Hinsdale, Ill., assignors to Sinclair Research, Inc., New York, N.Y., a corporation of Delaware
No Drawing. Filed Sept. 10, 1965, Ser. No. 486,523
U.S. Cl. 208—254             8 Claims
Int. Cl. C10g 17/00

ABSTRACT OF THE DISCLOSURE

Hydrocarbon feeds, e.g., boiling above 450° F., which contain nitrogen impurities are hydrorefined using a catalyst consisting essentially of about 0.5–5 weight percent of a platinum series metal and about 4–30 weight percent of molybdena on alumina, the catalyst having been presulfided. Hydrorefining conditions include a temperature of about 400–800° F.; however, when using ruthenium and iridium, temperatures of at least about 635° F. are employed.

---

This invention relates to the catalytic processing of petroleum hydrocarbon stocks which in many cases contain impurities and particularly relates to a platinum series metal-molybdena-alumina hydrodesulfurization catalyst especially suited for the hydrorefining of these hydrocarbon stocks.

The presence of sulfur and nitrogen-containing organic compounds in hydrocarbon oils has long been recognized as undesrable. Nitrogen compounds have a poisoning effect; they often tend to reduce or destroy the activity of catalysts employed to convert, e.g., crack, these stocks. The higher the nitrogen content of the charge stock, the higher will be the temperature required to effect a given amount of conversion, which eventually requires more frequent regeneration or replacement of the catalyst. Sulfur compounds are highly objectionable in hydrocarbon oils as the former have an unpleasant odor, tend to cause corrosion and often lead to sludging. These difficulties have led to various proposals for desulfurization and denitrogenation of almost all petroleum stocks which are normally liquid or which can be made fluid at treating temperature, including light distillates, middle and heavy distillates and even residual stocks. For instance, prior methods have included acid treatments, deasphalting and hydrogenolysis in contact with catalytic material such as molybdenum sulfide, tungsten oxide, nickel sulfide, tungsten sulfide, cobalt molybdate, cobalt tungstate, etc. Hydrogen treatment of the feed stocks has become widely accepted but it has been to effect this hydrogenation selectively, since the relatively severe conditions required for rapid hydrogenation with sulfur insensitive catalysts are prone to lead to destructive hydrogenation and resulting losses in liquid yield. In addition to searching for catalysts which effect this hydrogenation selectively with greater ease, the petroleum industry is continually looking for catalysts with hydrogenation properties suitable to remove sulfur and nitrogen poisons and with denitrogenation rates greater than that obtained with the commercially available catalysts. Among the prior art catalysts exhibiting relatively high hydrogenation-denitrogenation rates are the commonly utilized nickel oxide-molybdena and cobalt oxide-molybdena on alumina compositions. A catalyst exhibiting excellent hydrogenation rates is platinum on alumina; however, this catalyst is easily poisoned by the impurities being removed during hydrogenation, e.g., sulfur, nitrogen, etc.

Because of the increased use of petroleum stocks with a relatively high nitrogen content, emphasis has been placed recently on the need for hydrodesulfurization catalysts which exhibit higher denitrogenation rates than the commonly employed nickel oxide-molybdena and cobalt oxide-molybdena compositions, but without substantial reduction of the excellent hydrogenation properties thereof. Such catalysts must also, for economic reasons, have a high regenerability when employed in the upgrading of petroleum stocks.

We have found that a composition of a platinum series metal and molybdena on an alumina support, after having undergone a sulfiding treatment, is an excellent catalyst for the upgrading, through hydrogenation-denitrogenation, of petroleum stocks. The catalyst possesses denitrogenation rates significantly greater than those of catalysts heretofore employed, and most often the catalyst exhibits a greater hydrogenation rate. The catalyst of the present invention, prior to sulfiding, contains a metal of the platinum series, e.g., rhodium, palladium, or platinum, in amounts from about 0.5 to 5 percent by weight, preferably about 2.5 to 4%, and molybdena in amounts from about 4 to 30 percent by weight, preferably about 10 to 20 percent. The alumina base from which the catalyst is prepared can be made from any of the known hydrates by conversion to activated or calcined forms. Hydrates such as the mono-hydrate, boehmite; the tri-hydrates, bayerite I, nordstrandite and gibbsite; or another hydrous alumina which appears to be amorphous. Preferably the hydrates which contain a major proportion or consist essentially of boehmite may be utilized. Calcination converts these hydrates to an activated or gamma family type alumina, e.g., gamma, delta, eta, chi, etc., depending on the composition of the hydrate and choice of calcination conditions. The alumina hydrate can be prepared by any of the conventional methods; for example, an aqueous solution of aluminum chloride or other acidic aluminum salts can be reacted with aqueous ammonium hydroxide to precipitate an essentially boehmite or amorphous alumina hydrate. This material can be washed to remove chloride and ammonium ions.

Such alumina supports are usually characterized by a large surface area ranging from about 60 to 600 or more square meters per gram, preferably greater than about 200 square meters per gram as determined by the BET method. They may also have a relatively large content of pore volume in the pore size range of about 20 to 100 A. units, of the order of greater than 0.3, preferably greater than 0.6, cc. per gram of pore volume in pores of this size, although the mechanical steps of forming the catalyst into pellets, as by tabletting or extruding, may affect the amount of pore volume of this side. Typical alumina based catalysts made from boehmite alumina may have essentially no pores greater than about 50 A. units in size and have pore distributions which are similar to those of silica-alumina. On the other hand, the catalysts made from aluminas containing high percentages of the crystalline trihydrates in the precursor alumina mixtures have considerable pore volume in the 100–1000 A. units pore size range. These large pores do not occur in many alumina bases derived from the boehmite or monohydrate form of precursor alumina, either before or after calcination. The boehmite type of precursor alumina is often characterized by crystallite size of the order of 40 A. units before and after calcination and contains no pores larger than 50 A. units.

The molybdena may be deposited upon the catalyst support by any one of a number of methods well known in the art, such as impregnation, precipitation or dry mixing. Various methods can also be employed to introduce the platinum series metal, including impregnation with solutions or co-precipitation techniques. While in certain instances it may be desirable to introduce the platinum series metal into the catalyst together with the molybdena, these components will ordinarily be added one after the other.

According to one preferred method, a suitable molybdenum-containing material such as ammonium molybdate, molybdic acid or crude molybdena is first deposited upon a pre-dried, activated alumina. After drying, the composition is impregnated with an aqueous solution of chloroplatinic acid. The impregnated support is then calcined, for instance at temperatures of up to about 1200° F., usually at a temperature of at least about 400° F.

According to this invention the active state of the platinum series metal and molybdena of the catalyst composition is in chemical combination with sulfur. To convert the metals to their sulfides, conventional sulfiding methods may be employed. Advantageously, the metal-activated alumina catalyst in the oxide form as obtained from the calcination step may be sulfided by passing hydrogen sulfide, either pure or diluted with another gas such as, for instance, hydrogen, over the catalyst bed at temperatures usually of about 300 to 1000° F., preferably about 300 to 700° F., for a time sufficient to convert a significant portion of the oxides of the metal components to their respective sulfides. Subsequent to the sulfidation step the treated catalyst should not be brought into contact with air.

Catalysts prepared according to the method of the present invention have been found to be particularly useful for the removal of non-hydrocarbon impurities such as sulfur and nitrogen compounds, and for the hydrogenation of unsaturated, i.e., olefinic and aromatic, hydrocarbons from a wide range of petroleum, coal tar and shale derived hydrocarbon stocks boiling primarily above about 400° F., preferably above about 450° F. and having a nitrogen content greater than about 5 p.p.m., often greater than about 20 p.p.m. The hydrocarbon stocks include mineral oil base stocks for lubricants, lighter petroleum distillates such as gas oil for catalytic cracking and hydrocracking, wax distillates from paraffin crudes, catalytically cracked coal tar distillates and the like. The processing conditions of the desulfurization, denitrogenation and hydrogenation will vary with the feedstock desired. Generally the temperatures will be in the range of about 400 to 800° F., preferably in the range of about 500 to 750° F. Pressures may range from atmospheric to about 10,000 p.s.i.g., preferably about 100 to 3000 p.s.i.g. The weight hourly space velocity (weight of feed per weight of catalyst per hour, WHSV) can be in the range of about 0.1 to 10, preferably 0.25 to 5, WHSV. A molar ratio of hydrogen to hydrocarbon charge of about 1 to 20, preferably from 1 to 10, may be employed.

The process of this invention may be carried out in any equipment suitable for catalytic operation and may be operated batchwise or continuously. It is preferable, however, and generally more feasible to operate continuously. Accordingly, the process is adaptable to operations using a fixed bed of catalyst. Also, the process can be operated using a moving bed of catalyst wherein the hydrocarbon flow may be concurrent or countercurrent to the catalyst flow. A fluid type of operation may also be employed with the catalyst described herein.

The following examples compare the hydrogenation and denitrogenation activities of the catalyst of this invention with those of the more common catalysts utilized for hydrogenation upgrading of petroleum stocks.

Example I

In each run, three grams of catalyst were crushed and screened to 30 mesh or finer and placed in a 300 cc. autoclave. Pretreatment of the catalyst consisted of evacuating with house vacuum and pressuring up with 250 p.s.i.g. hydrogen sulfide for 10 minutes at room temperature with stirring (600 r.p.m.). The system was depressured to 50 p.s.i.g. hydrogen sulfide and heating was begun with stirring. The temperature was raised from room temperature to 600° F. overnight (ca. 16 hours). At this point stirring was stopped, hydrogen admitted to a total pressure of 1,000 p.s.i.g., 95 ml. of hydrocarbon pressured from a blowcase to the bomb and stirring was started. The system was such that a continual pressure of 1,000 p.s.i.g. hydrogen was on the contents of the bomb at all times. At intervals of 30 minutes, or multiples thereof, a small sample (2 to 3 ml.) was withdrawn from the bomb and a refractive index taken on the sample. When the refractive index reached 1.5800 (representing approximately 50% hydrogenation to the tetralin stage) the heat, hydrogen and stirring were shut off and the bomb cooled to room temperature. Decalin production was checked by gas chromatography but none was found in these runs. The bomb was dismantled and the hydrocarbon separated from the catalyst by filtration. Products were submitted for total N (p.p.m.) analysis to determine denitrogenation activities. The hydrogenation-denitrogenation results obtained in this operation as shown in Table I below.

TABLE I

Conditions: 600° F., 1,000 p.s.i.g., 1,000 r.p.m., 3 g. catalyst
Feed: 95 ml. 1-methylnaphthalene + 100 p.p.m. N as quinoline
Reactor: 300 cc. Magnedrive Autoclave

| | Run | | | | | | |
|---|---|---|---|---|---|---|---|
| | I | II | III | IV | V | VI | VII |
| | Catalyst | | | | | | |
| | 4% Ni-16% MoO$_3$-Al$_2$O$_3$ | 4% Co-16% MoO$_3$-Al$_2$O$_3$ | 3% Pt-Al$_2$O$_3$ | 16% MoO$_3$-Al$_2$O$_3$ | 3% Pt-16% MoO$_3$-Al$_2$O$_3$ | 1.7% Pt-16% MoO$_3$-Al$_2$O$_3$ | 5% Pt-16% MoO$_3$-Al$_2$O$_3$ |
| Time (min.) to reach 1.5800D$^{25}$ | 222 | 300 | >1,000 | 400 | 203 | 280 | 240 |
| N p.p.m. in Product | 8.9 | 13 | 8.3 | 13 | 0.8 | 5.5 | 4.7 |
| Rel. Hydrogenation Activity | 1.0 | 0.74 | <0.1 | 0.56 | 1.1 | 0.79 | 0.93 |
| Rel. Denitrogenation Activity | 1.0 | 0.69 | 1.1 | 0.69 | 11 | 1.6 | 1.9 |

For comparative purposes the alumina supported catalyst containing 4% nickel and 16% molybdena (Run I) is designated as the base-line catalyst, hydrogenation and denitrogenation activities thereof each being assigned the value of 1.0. The catalytic activities computed for Runs II through VII are, accordingly, relative to those of the commonly utilized nickel-molybdenum-alumina catalyst. Run II illustrates the activities of another commonly employed hydrogenation catalyst, cobalt-molybdena-alumina. Runs III and IV show the activities of a catalyst containing platinum alone on alumina and a catalyst containing molybdena alone on alumina. Runs V through VII compare the activities of alumina supported catalysts containing 16% molybdena and varying amounts of platinum. As can be readily determined from Table I the catalysts of this invention (Runs V–VII) exhibit denitrogenation activities considerably higher than either the nickel-molybdena catalyst or the cobalt-molybdena catalyst, while at the same time effecting hydrogenation at rates greater than or nearly equal to those of the prior art catalysts. It is noted also that the activity of the combination platinum-molybdena catalyst (Run V) is more than a cumulative result of using platinum and molybdena alone (Runs III and IV). Run VI illustrates that the use of less than 2% by weight of platinum in a platinum-molybdena catalyst results in increased denitrogenation yet slightly lower hydrogenation activities than achieved through the use of the nickel-molybdena catalyst.

Example II

Light cycle oil was hydrogenated in a continuous operation using a 9/16 inch Universal Stainless Steel reactor. The effects of different catalysts are shown in Table II below.

TABLE II

Conditions: 680° F., 1,000 p.s.i.g., 7 $H_2$/l. hydrocarbon feed, 3.6 WHSV
Feed: Light cycle, 390 p.p.m. N, $n_D{}^{25}$=1.5133
Reactor: 9/16″ Universal S.S. reactor

| | Run | | | | | |
|---|---|---|---|---|---|---|
| | VIII | IX | X | XI | XII | XIII |
| | Catalyst | | | | | |
| | 4% Ni-16% MoO$_3$-Al$_2$O$_3$ | 3% Pt-16% MoO$_3$-Al$_2$O$_3$ | 1% Pt-5% MoO$_3$-Al$_2$O$_3$ | 1.2% Pt-21% MoO$_3$-Al$_2$O$_3$ | 1.7% Pt-16% MoO$_3$-Al$_2$O$_3$ | 3% Pd-20% MoO$_3$-Al$_2$O$_3$ |
| Rel. Hydrogenation Activity | 1.0 | 1.25 | 1.0 | 0.88 | 0.93 | 1.0 |
| Rel. Denitrogenation Activity | 1.0 | 21 | 5.0 | 5.0 | 2.5 | 4.0 |

Runs IX thru XII, wherein various combinations of platinum and molybdena were employed, are again evidence of the superior denitrogenation activities of the catalysts of this invention. The uniqueness of the 3% platinum-16% molybdena-alumina is also demonstrated here. Run XIII shows a similarly high denitrogenation activity when palladium is substituted for platinum.

Example III

Heavy cycle oil was hydrogenated in a continuous operation using a Universal S.S. 1 inch I.D. reactor. The hydrogenation-denitrogenation activities of the catalysts employed are illustrated in Table III below.

TABLE III

Conditions: 725° F., 1,500 p.s.i.g., 1 WHSV, 7 $H_3$/l. hydrocarbon feed
Feed: Heavy cycle oil, 710 p.p.m. N, $n_D{}^{25}$=1.5250

| | Run | | |
|---|---|---|---|
| | XIV | XV | XVI |
| | Catalyst | | |
| | 4% Ni-16% MoO$_3$-Al$_2$O$_3$ | 2.7% Pt-12% MoO$_3$-Al$_2$O$_3$ | 3% Pt-16% MoO$_3$-Al$_2$O$_3$ |
| Rel. Hydrogenation Activity | 1.0 | 1.2 | 1.1 |
| Rel. Denitrogenation Activity | 1.0 | 4 | 1.5 |

Table III gives the results obtained with the catalyst of this invention (Runs XV and XVI) as compared to a standard nickel-molybdena catalyst (Run XIV). It should be noted that as one progresses from light stocks to heavier stocks the type and concentration of nitrogen contaminants change which affects catalyst activity. Comparing light cycle oil tests (Table II) to heavy cycle oil tests (Table III) the catalyst of this invention is still more active than the standard catalysts.

Example IV

In addition to the platinum series metal-molybdena compositions, other combinations of catalytic materials were tried unsuccessfully, for example, those shown in Table IV.

TABLE IV

Conditions: 600° F., 1,000 p.s.i.g., 1,000 r.p.m., 3 g. catalyst
Feed: 95 ml. 1-methylnaphthalene + 100 p.p.m. N as quinoline
Reactor: 300 cc. Magnedrive Autoclave

| | Run | | | |
|---|---|---|---|---|
| | XVII | XVIII | XIX | XX |
| | Catalyst | | | |
| | 3% Pt-3% Bi-16% MoO$_3$-Al$_2$O$_3$ | 3% Pt-21% WO$_3$-Al$_2$O$_3$ | 5% Pd-16% WO$_3$-Al$_2$O$_3$ | 3% Pd-16% MoO$_3$-MnO$_2$-Al$_2$O$_3$ |
| Time (min.) to reach 1.5800 $D^{25}$ | 560 | 900 | 900 | 470 |
| N p.p.m. in Product | 3.9 | 8.3 | 20 | 15 |
| Rel. Hydrogenation Activity | 0.40 | 0.25 | 0.25 | 0.48 |
| Rel. Denitrogenation Activity | 2.3 | 1.1 | 0.44 | 0.59 |

Example V

Catalysts containing other platinum series metals, ruthenium and iridium, in addition to molybdena and alumina, were employed in the hydrogenation of 1-methylnaphthalene in the manner employed in Example I only with slight changes in operating temperatures as indicated in Table V below.

TABLE V

Conditions: 1,000 p.s.i.g.; 1,000 r.p.m., 3 g. catalyst
Feed: 95 ml. 1-methylnaphthalene + 100 p.p.m. N as quinoline
Reactor: 300 cc. Magnedrive Autoclave

| | Run | | | |
|---|---|---|---|---|
| | XXI | | XXII | |
| | Catalyst | | | |
| | 3% Ru-16% MoO$_3$-Al$_2$O$_3$ | | 3% Ir-16% MoO$_3$-Al$_2$O$_3$ | |
| Temp., °F | 605 | 635 | 605 | 635 |
| Relative Hydrogenation Activity | 0.34 | 1.11 | 0.49 | 1.34 |
| Relative Denitrogenation Activity | 0.91 | 1.18 | 1.37 | 1.43 |

Table V demonstrates the importance of the hydrogenation temperature when the platinum series metal of the catalyst of this invention is ruthenium or iridium. Whereas other platinum series meta-molybdena-alumina catalysts effect hydrogenation and denitrogenation of petroleum stocks at rates greater than the catalysts of the prior art, e.g., nickel-molybdena-alumina, at temperatures from about 400 to 800° F., catalysts of the present invention employing ruthenium or iridium, as the platinum series metal, possess adequate hydrogenation and good denitrogenation activities only when employed with process temperatures equal to or greater than about 635° F.

The percentages of platinum series metal and molybdena in the catalyst of this invention which provide optimum performance vary according to the nature of the hydrocarbon feed being upgraded. For example, when the hydrocarbon feed is light cycle oil (Table II) or 1-methylnaphthalene (Table I), a catalyst which, prior to sulfidation, contains 3% by weight of platinum, 16% by weight by molybdena and the balance alumina exhibits nearly optimum activities; whereas when the feed is heavy cycle oil (Table III) the catalyst containing lesser amounts of platinum and molybdena, 2.7% and 12% respectively, is to be preferred. Optimum conditions then may vary from feed to feed.

It is claimed:

1. A process for hydrorefining a hydrocarbon feed boiling primarily above about 450° F. and containing nitrogen impurities which comprises contacting said feed in admixture with molecular hydrogen with a sulfided catalysts under hydrorefining conditions including a temperature of about 400 to 800° F., said catalyst, prior to sulfiding, consisting essentially of about 0.5 to 5% by weight of a platinum series metal and about 4 to 30% by weight of molybdena on alumina, with the proviso that when said platinum series metal is selected from the group consisting of ruthenium and iridium said hydrorefining temperature is at least about 635° F.

2. The process of claim 1 wherein the catalyst, prior to sulfiding, consists essentially of about 2.5 to 4% of the platinum series metal and about 10 to 20% of the molybdena.

3. The process of claim 1 wherein the platinum series metal is platinum.

4. The process of claim 1 wherein the hydrorefining conditions include a pressure of about 0 to 10,000 p.s.i.g., a weight hourly space velocity of about 0.1 to 10 WHSV and a molar ratio of hydrogen to hydrocarbon feed of from about 1/1 to 20/1.

5. The process of claim 1 wherein the hydrorefining conditions include a temperature of from about 500 to 750° F., a pressure of about 100 to 3,000 p.s.i.g., a weight hourly space velocity of about 0.25 to 5 WHSV and a molar ratio of hydrogen to hydrocarbon feed of from about 1/1 to 10/1.

6. The process of claim 5 wherein the platinum series metal is platinum, and wherein the catalyst, prior to sulfiding, consists essentially of about 2.5 to 4% by weight of platinum and about 10 to 20% by weight of molybdena on alumina.

7. The process of claim 1 wherein the hydrocarbon feed contains nitrogen impurities in amounts greater than about 20 parts per million.

8. The process of claim 6 wherein the hydrocarbon feed contains nitrogen impurities in amounts greater than about 20 parts per million.

References Cited

UNITED STATES PATENTS

| | | | |
|---|---|---|---|
| 2,861,959 | 11/1958 | Thorn et al. | 252—465 |
| 3,177,160 | 4/1965 | De Rosset | 252—265 |
| 3,256,177 | 6/1966 | Tulleners | 208—89 |
| 3,294,673 | 12/1966 | Peck et al. | 208—254 |
| 3,248,318 | 4/1966 | White | 252—439 |
| 3,254,018 | 5/1966 | Watkins | 208—254 |
| 3,269,958 | 8/1966 | Gatsis | 252—439 |
| 3,291,724 | 12/1966 | Gleim | 208—254 |

DELBERT E. GANTZ, *Primary Examiner*

G. J. CRASANAKIS, *Assistant Examiner.*

U.S. Cl. X.R.

252—465, 439